April 13, 1954     C. F. SMITH     2,675,317
PHOTOGRAPHIC STRIPPING FILM FOR SILK SCREEN PROCESS
Filed Aug. 16, 1952
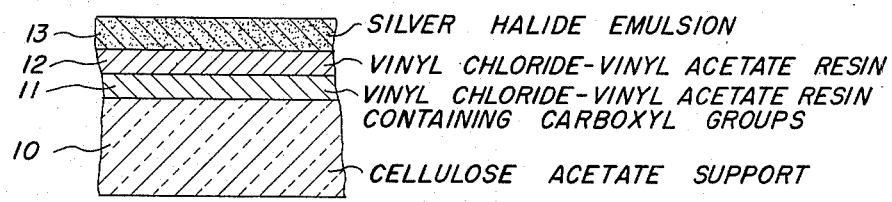
CARL F. SMITH
INVENTOR.
BY Daniel I. Mayne
R. Frank Smith
ATTORNEYS Patented Apr. 13, 1954

2,675,317

UNITED STATES PATENT OFFICE 2,675,317

PHOTOGRAPHIC STRIPPING FILM FOR SILK SCREEN PROCESS

Carl F. Smith, Rochester, N. Y., assignor to Eastman Kodak Company, Rochester, N. Y., a corporation of New Jersey Application August 16, 1952, Serial No. 304,687

3 Claims. (Cl. 95—9)

This invention relates to photographic film and particularly to a stripping film for use in the silk screen process.

It is known that in the silk screen process a relief image may be formed in a photographic emulsion layer on a special stripping film, the gelatin image transferred to the silk screen and the support of the original film stripped or peeled away. The relief image remaining on the silk screen forms a stencil for silk screen printing. A process of this type is described in Yackel U. S. patent application Serial No. 256,243, filed November 14, 1951.

In the stripping film used in this process the degree of adhesion between the light-sensitive emulsion and the film base is rather critical. It must be great enough when the film is dry to hold the emulsion through handling and cutting as well as keeping at low relative humidities. Adhesion should be sufficient to keep the exposed emulsion from washing off while the unexposed portions are being removed in the formation of the relief image to be used as the stencil. However, the adhesion must not be so great that the base or support of the film cannot be removed after the gelatin stencil has been dried on the silk screen. At this point it is essential that separation between the relief image and the film support take place cleanly and easily so that portions of the stencil are not pulled off the silk when the film base is removed. This is especially important when the silk screen image consists of half-tone dots adhering to only one or two strands of the silk screen mesh.

It is therefore an object of the present invention to provide a novel subbing method for a stripping film to be used in the silk screen process. A further object is to provide a subbing technique which furnishes the proper degree of adhesion for use in a film for the silk screen process. A still further object is to provide a subbed film base upon which the gelatin emulsion can be coated and easily removed by use of a suitable solvent after formation of a relief image and transferred to a silk screen. Other objects will appear from the following description of my invention.

These objects are accomplished by coating a cellulose ester film base, especially a cellulose acetate film base, with successive layers of vinyl chloride-vinyl acetate resinous copolymer of the composition described below, followed by a gelatino-silver halide emulsion layer.

The drawing shows in sectional view a film constructed according to my invention.

The preferred support for my film is a substantially fully esterified cellulose acetate containing about 43.5% by weight of acetyl groups, although other cellulose esters may be used such as partially hydrolyzed cellulose acetate or partially hydrolyzed or fully esterified cellulose propionate, cellulose acetate propionate, etc.

The subbing layers are resinous copolymers of vinyl chloride and vinyl acetate such as those copolymers sold under the trade name Vinylite. The resinous sub first coated on the support comprises a copolymer of vinyl chloride, vinyl acetate, and an $\alpha,\beta$-unsaturated dicarboxylic acid such as maleic or fumaric acid. This resin preferably contains about 86% by weight vinyl chloride groups, 13% by weight vinyl acetate groups and 1% by weight carboxylic acid groups. It is coated from a solvent such as ethylene dichloride or methylene chloride which has a sufficient attack power for the cellulose ester support in order to cause the resin to adhere.

Over this undercoat there is applied a solution of a mixture of the undercoat resin first applied and a vinyl chloride-vinyl acetate resinous copolymer preferably having a higher vinyl chloride content than that of the undercoat first applied. This resinous polymer contains no carboxylic acid groups and comprises a resin containing approximately 87% by weight vinyl chloride groups and 13% by weight vinyl acetate groups, although the vinyl chloride content may range from 70% to 93% by weight. The concentration of this resin in the mixture is from 50% to 90% of the solids content of the solution and the proportion of the undercoat resin containing carboxylic acid groups is from 50% to 10% of the solids content of the mixture.

The fine degree of adhesion between the light-sensitive emulsion which is next applied, and the base, is attained by the proper mixture of the high vinyl chloride resin, which is incompatible with the emulsion, and the lower chloride carboxyl-containing resin which is compatible. This combination does not adhere to the cellulose acetate base and therefore makes necessary the lower vinyl chloride carboxyl-containing resin undercoat.

My invention will be further illustrated by reference to the following specific example:

A cellulose acetate support containing about 43.5% by weight of acetyl groups was coated with a solution of a resinous copolymer containing 86% by weight of vinyl chloride, 13% by weight of vinyl acetate and 1% by weight of dibasic acid groups, the solution having the following composition:

| | Per cent |
|---|---|
| Resin | 1.0 |
| Ethylene dichloride | 99 |

After this layer was dry it was coated with a mixture of resin A (having the composition described in the preceding paragraph) and resin B comprising a resinous copolymer containing 87% by weight of vinyl chloride and 13% by weight of vinyl acetate, the solution having the following composition:

| | Per cent |
|---|---|
| Resin A | 0.1 |
| Resin B | 0.9 |
| Ethylene dichloride | 99.0 |

When dry this layer was coated with a gelatino-silver halide emulsion layer.

The emulsion layer coated on the film is a gelatino-silver halide emulsion layer preferably containing a dispersion of a tanning developing agent and a dispersion of a soft synthetic resin as described in Yackel U. S. application Serial No. 256,243. The resin dispersion contained in the emulsion may be an aqueous dispersion of polymethyl or polyethyl acrylate or a copolymer of ethyl acrylate and acrylonitrile or it may be a dispersion of a copolymer of butyl acrylate-styrene-methacrylamide resin. In addition to the developing agent and resin dispersions, the emulsion may also contain the usual spreading agents, softening agents such as glycerine and thioglycolic amide and light absorbing dyes for controlling contrast and light penetration of the emulsion. The complete structure may be used in a process such as that described in Yackel application Serial No. 256,243.

My film will now be described by reference to the accompanying drawing. As shown therein a support 10 of cellulose acetate is coated with a layer 11 of the resinous copolymer of vinyl chloride and vinyl acetate containing carboxyl groups and this layer is coated with a layer 12 of the mixed undercoat resin and vinyl chloride-vinyl acetate copolymer. On the layer 12 there is coated a gelatino-silver halide emulsion layer 13.

It will be understood that modifications may be made in my invention within the scope of the appended claims.

I claim:

1. A photographic stripping film comprising in order, a cellulose ester support, a layer of a resinous copolymer of vinyl chloride, vinyl acetate and an $\alpha,\beta$-unsaturated dicarboxylic acid, a layer containing a mixture of from 50% to 10% of said resinous copolymer and from 50% to 90% of a resinous copolymer containing approximately 87% vinyl chloride and the remainder vinyl acetate, and a gelatino-silver halide emulsion layer.

2. A photographic stripping film comprising in order, a cellulose acetate support, a layer of vinyl resin containing by weight approximately 86% vinyl chloride, 13% vinyl acetate and 1% dibasic carboxylic acid, a layer containing a mixture of from 50% to 10% of said vinyl resin and from 50% to 90% of a vinyl resin containing by weight approximately 87% vinyl chloride and 13% vinyl acetate, and a gelatino-silver halide emulsion layer.

3. A photographic stripping film comprising in order, a cellulose acetate support, a layer of a resinous copolymer containing by weight approximately 86% vinyl chloride, 13% vinyl acetate and 1% dibasic carboxylic acid, a layer containing approximately 10% of said resinous copolymer and 90% of a resinous copolymer containing approximately 87% vinyl chloride and 13% vinyl acetate, and a gelatino-silver halide emulsion layer.

References Cited in the file of this patent

UNITED STATES PATENTS

| Number | Name | Date |
|---|---|---|
| 2,462,151 | Woodward | Feb. 22, 1949 |